(12) United States Patent
Choi et al.

(10) Patent No.: US 8,608,101 B2
(45) Date of Patent: *Dec. 17, 2013

(54) LOCKING MEMBER MOUNTING STRUCTURE OF SEAT BELT RETRACTOR

(75) Inventors: In-Su Choi, Gyeonggi-do (KR); Jung-Min Lee, Seoul (KR); Byung-Jin Lee, Daegu (KR); Dong-Sub Lee, Gangwon-do (KR); Sang-Hong Bai, Gangwon-do (KR); Gi-Young Bae, Gangwon-do (KR); Jong-Kag Kim, Gangwon-do (KR); Do-Shik Kim, Seoul (KR)

(73) Assignee: Autoliv Development AB, Vårgårda (SE)

( * ) Notice: Subject to any disclaimer, the term of this patent is extended or adjusted under 35 U.S.C. 154(b) by 737 days.

This patent is subject to a terminal disclaimer.

(21) Appl. No.: 12/152,664

(22) Filed: May 14, 2008

(65) Prior Publication Data

US 2009/0057469 A1   Mar. 5, 2009

(30) Foreign Application Priority Data

May 16, 2007   (KR) .................. 10-2007-0047778

(51) Int. Cl.
*B65H 75/48* (2006.01)
*B60R 22/38* (2006.01)

(52) U.S. Cl.
USPC ........................................................ 242/382

(58) Field of Classification Search
USPC ............. 242/383, 383.1, 383.2, 383.3, 383.4, 242/383.5, 384, 384.1, 384.5, 384.6, 382, 242/382.5; 280/806, 807; 297/478
See application file for complete search history.

(56) References Cited

U.S. PATENT DOCUMENTS

| | | | |
|---|---|---|---|
| 4,186,895 A * | 2/1980 | Burghardt et al. | 242/383.3 |
| 4,244,600 A | 1/1981 | Takada | |
| 4,278,216 A | 7/1981 | Takada | |
| 4,392,620 A | 7/1983 | Takada | |
| 4,401,282 A | 8/1983 | Miki | |
| 4,726,540 A | 2/1988 | Ches et al. | |
| 4,801,105 A * | 1/1989 | Frisk | 242/383.4 |
| 5,071,194 A * | 12/1991 | Fohl | 297/478 |
| 5,375,787 A | 12/1994 | Fujimura et al. | |
| 5,443,224 A | 8/1995 | Patterson et al. | |

(Continued)

FOREIGN PATENT DOCUMENTS

JP    2003-212086    7/2003

*Primary Examiner* — Sang Kim
*Assistant Examiner* — Juan Campos, Jr.
(74) *Attorney, Agent, or Firm* — Brinks Gilson & Lione

(57) ABSTRACT

Provided is a locking member mounting structure of a seat belt retractor including: a locking base coupled to one side of a guide drum; a locking clutch rotatably coupled to one side surface of the locking base; a lock arm coupled to one side surface of the locking clutch so as to rotate at a predetermined angle; and a mechanism cover covering the locking clutch and the lock arm, wherein a leaf spring is fixed to extend to one side from a boss formed in the center of the locking clutch, and a fixing piece projects from one surface of the lock arm so as to be fixed to the leaf spring.
The leaf spring which returns the lock arm installed in the locking clutch is easily assembled, and assembly time of the leaf spring is reduced, thereby increasing productivity. Further, since the leaf spring has a curved portion or is formed in a stair shape, elasticity of the leaf spring is maintained, and deformation of the leaf spring is prevented.

2 Claims, 8 Drawing Sheets

(56) References Cited

U.S. PATENT DOCUMENTS

| | | |
|---|---|---|
| 5,495,994 A | 3/1996 | Rumpf et al. |
| 5,568,941 A | 10/1996 | Woydick et al. |
| 5,794,876 A | 8/1998 | Morizane et al. |
| 5,826,813 A | 10/1998 | Hibata |
| 5,984,223 A | 11/1999 | Hiramatsu |
| 6,283,398 B1 * | 9/2001 | Specht ............... 242/383.4 |
| 6,299,093 B1 | 10/2001 | Harte et al. |
| 6,318,662 B1 | 11/2001 | Hori et al. |
| 6,354,528 B1 | 3/2002 | Nagata et al. |
| 6,641,077 B2 * | 11/2003 | Hanna et al. ............... 242/382.2 |
| 6,698,677 B1 | 3/2004 | Happ et al. |
| 7,290,730 B2 | 11/2007 | Nagata et al. |
| 7,401,815 B2 | 7/2008 | Clute |
| 2001/0004094 A1 * | 6/2001 | Hanna et al. ............... 242/382.2 |
| 2005/0211816 A1 | 9/2005 | Takamatsu et al. |

* cited by examiner

LOCKING MEMBER MOUNTING STRUCTURE OF SEAT BELT RETRACTOR

CROSS-REFERENCE TO RELATED APPLICATION

This application claims the benefit of Korean Patent Application No. 2007-0047778, filed May 16, 2007, the disclosure of which is hereby incorporated herein by reference in its entirety.

BACKGROUND OF THE INVENTION

1. Field of the Invention

The present invention relates to a locking member mounting structure of a seat belt retractor, and more specifically, to a locking member mounting structure of a seat belt retractor in which a lock arm is returned by a leaf spring extending from a protrusion.

2. Description of the Prior Art

A seat belt or an airbag is installed in a vehicle to safely protect a driver and a passenger from traffic accidents.

Such a seat belt is a basic safety device installed to operate upon vehicle accidents such as front collision, side collision, roll, and so on, to thereby maximally protect a driver and a passenger.

A widely used seat belt is a three-point safety belt constituted of a waist belt for protecting the waist of the passenger (hereinafter, including "driver"), and a shoulder belt for protecting the shoulder and the breast. A guide pulley is coupled with the shoulder belt, a retractor is installed at a center pillar of a vehicle to release or wind the belt, and the waist belt is fastened to a locker panel.

In addition, a tongue is inserted in a mid-portion of the belt, and the tongue can be locked to or released from a buckle fixed to a floor of the vehicle.

Further, the retractor for winding or releasing the seat belt is classified into a non-locking retractor (NLR), an emergency locking retractor (ELR), and a web locking retractor (WLR).

The non-locking retractor is locked after adjusting lengths of the shoulder belt and the waist belt. On the other hand, in the emergency locking retractor, the belt is freely retracted and rewound during stoppage or movement of the vehicle, and the belt is locked only when a vehicle collision causing abrupt deceleration occurs or when the belt is rapidly extracted.

In addition, in the web locking retractor, a clamp directly grips the belt upon vehicle collision to stop extraction of the belt, thereby preventing serious injury to the passenger due to abrupt forward movement of the passenger.

Meanwhile, Japanese Patent Laid-open Publication No. H05-193441 discloses a "Seat Belt Retractor", which will be briefly described below.

In the seat belt retractor, when a lock gear is relatively rotated in one direction with respect to a reel shaft, a projecting shaft is moved by a first cam, and a main pawl is rotated in one direction. Further, a gear to be engaged with first and second engagement pawls is determined, and the projecting shaft is moved along a hole. Therefore, a backup pawl is not rotated.

In addition, when the lock gear is relatively rotated with respect to one direction, the first and second engagement pawls are geared with the gear, and the projecting pawl is moved along the diameter-direction hole. Then, the backup pawl is rotated in one direction, and a gear to be engaged with the backup pawl is determined. As the lock gear is relatively rotated with respect to one direction, the first and second engagement pawls are engaged with the gear. Simultaneously, the backup pawl is engaged with the gear.

Further, Japanese Patent Laid-open Publication No. 2000-289571 discloses a "Webbing Winding Device", which will be briefly described.

The webbing winding device includes a frame supported by a vehicle body, a winding shaft rotatably supported by the flame and winding a webbing for passenger-restriction in a layered manner, and a lock means for prohibiting rotation in a webbing extraction direction upon rapid deceleration of a vehicle.

The lock means includes a first lock part concentrically disposed with respect to the winding shaft and rotated about the winding shaft to prevent rotation in a webbing extraction direction upon rapid deceleration of a vehicle, and a second lock part concentrically disposed with respect to the winding shaft, integrally rotated with the winding shaft, and plastically deformable to generate relative rotation with respect to the first lock part when the rotation of the first lock part in a webbing extraction direction is prevented.

In addition, the webbing winding device further includes a third lock part formed of a single part, supported movable in radial direction by the second lock part, and having a high strength lock gear movable in radial outward direction when relative movement between the first lock part and the second lock part is generated, and a fourth lock part installed at the frame and having a high strength lock gear hooked with the lock gear of the third lock part when the third lock part moves in radial outward direction.

Further, the webbing winding device further includes a guide part for displacing a predetermined portion of the second lock part in an opposite direction of an engagement position and plastically deforming the predetermined portion to be directly coupled to the fourth lock part using reaction when the lock gear of the third lock part is engaged with the lock gear of the fourth lock part.

In addition, Japanese Patent Laid-open Publication No. 2000-302010 discloses a "Webbing Winding Device", which will be briefly described below.

The webbing winding device includes a winding shaft, which is engaged with an end of a webbing belt restricting the body of a passenger in a mounted state and winds the webbing belt by rotating in a winding direction around the shaft by itself, and a lock unit having a rotating body which can coaxially rotate in an extraction direction opposite to the winding direction with respect to the rotation of the winding shaft and a lock mechanism which is interlocked with the relative rotation of the rotating body in the winding direction with respect to the winding shaft so as to lock the rotation of the winding shaft in the extraction direction.

Further, the webbing winding device includes a pair of walls, of which one wall is installed in the rotating body and the other wall is installed in the rotating body so as to face the one wall in the winding direction side of the one wall, and a compression coil spring which is disposed between the pair of walls. The compression coil is compressed by a pressing force from the other wall, caused by the rotation of the winding shaft, and simultaneously, presses the one wall using a restoring force from the compressed state.

In addition, the webbing winding device includes a restriction unit which is integrally installed in the rotating body and the winding shaft, respectively. The restriction unit restricts the displacement of the compression coil spring along a direction crossing the axis of the compression coil spring outside the compression coil spring.

Further, the webbing winding device includes an insertion hole which passes through the rotating body between the pair of walls and toward the other wall rather than the one wall. Further, an opening dimension from the one wall to the other wall is more than the overall length of the compressed compression coil spring and is less than the overall length of the compression coil spring in a normal state. The compression coil spring having the rotating body interposed therein can be inserted between the pair of walls and into the restriction unit from the opposite side to the walls through the insertion hole.

Meanwhile, Japanese Patent Laid-open Publication No. 2003-212085 discloses a "Safety Belt Retractor", which will be briefly described below.

The safety belt retractor includes a "⊏"-shaped housing body constituted of a pair of opposite side plates having through-holes, respectively, a shaft body integrally rotatably connected to the winding drum, on which the webbing is wound, passing through the through-holes to be rotatably supported by the side plates, and rotatably paused in a webbing winding direction, an emergency lock mechanism for stopping rotation of a webbing in an extraction direction of the shaft body, and first and second lock start mechanisms for operating the emergency lock mechanism.

The emergency lock mechanism includes a lock gear formed at an inner periphery of one through-hole of the housing body, a lock base mounted inside the lock gear to be integrally rotated with the shaft body, and a pawl retained at the lock base and engaged with the lock gear projecting from an outer periphery of the lock base.

In addition, the safety belt retractor includes a lock clutch rotatably mounted with respect to the shaft body adjacent to an outer surface of the lock base, synchronously rotatably mounted at the lock base in a state that pushed in the webbing extraction direction, having a ratchet wheel having a ratchet formed at its outer periphery, having an interlocking pin projected from the pawl and slidably guided by relative rotation with respect to the lock base, and having a guide groove projecting from the pawl.

Further, the first lock start mechanism includes an inertia mass body rocked in response to abrupt acceleration of a vehicle, and a sensor lever engaged with the ratchet of the ratchet wheel depending on rocking of the inertia mass body to prevent rotation of the lock clutch body.

Furthermore, the second lock start mechanism includes a cover body coupled to the housing body covering a portion of the first and second lock mechanisms, disposed inside the ratchet wheel, and having a cylindrical coupling inner periphery wall having inner periphery teeth projecting therefrom, and a lock arm rotatably supported at one side of the lock clutch body with respect to the cover body to prevent rotation of the lock clutch engaged with an internal gear by rotation delay in an opposite direction of the bias direction caused by abrupt rotation of the lock clutch body biased in an opposite direction separated from the internal gear of the coupling inner periphery wall.

The cover body includes an inner periphery wall support part, which is formed projecting toward the side plates.

As shown in FIG. 1, the lock clutch body 12 coupled to the safety belt retractor has a spring support 12c projecting on one side surface thereof and a release spring 22 installed in another position of the lock clutch body 12. The spring support 12c is loosely inserted so as to freely move inside a spring housing portion formed in the lock clutch body 12.

To return the lock arm, the seat belt retractor has a rocking stopper as well as the release spring installed therein. The rocking stopper restricts an angle at which the lock arm is rotated. Therefore, the shape and structure of the lock clutch are very complex. Further, since the release spring is coupled to the lock arm, it is difficult to assemble the release spring, and assembly time is lengthened, thereby increasing manufacturing cost.

SUMMARY OF THE INVENTION

The present invention has been made to solve the above-described problems, and an object of the present invention is to provide a locking member mounting structure of a seat belt retractor which returns a lock arm by using the elasticity of a leaf spring, without a troublesome release spring installed therein.

In order to accomplish the object, an aspect of the present invention provides a locking member mounting structure of a seat belt retractor including: a locking base coupled to one side of a guide drum; a locking clutch rotatably coupled to one side surface of the locking base; a lock arm coupled to one side surface of the locking clutch so as to rotate at a predetermined angle; a fixing piece projecting from one surface of the lock arm; and a spring for recovering the lock arm, wherein one end of the spring is fixed to a center boss of the locking clutch, and the other end is fixed to the fixing piece.

Another aspect of the present invention provides a locking member mounting structure of a seat belt retractor including: a locking base coupled to one side of a guide drum; a locking clutch rotatably coupled to one side surface of the locking base; a lock arm coupled to one side surface of the locking clutch so as to rotate at a predetermined angle; a fixing piece projecting from one surface of the lock arm; and a spring for recovering the lock arm, wherein one end of the spring is fixed to a stopper formed at the locking clutch, and the other end is fixed to the fixing piece.

Still another aspect of the present invention provides a locking member mounting structure of a seat belt retractor including: a locking base coupled to one side of a guide drum; a locking clutch rotatably coupled to one side surface of the locking base; a lock arm coupled to one side surface of the locking clutch so as to rotate at a predetermined angle; and a spring formed in an arcuate shape to be inserted into a boss forming a rotation center of the lock arm and extending toward both sides of the arcuate shape, wherein one end of the spring is fixed to the lock arm and the other end of the spring is fixed to a stopper formed at the locking clutch.

Yet another aspect of the present invention provide a locking member mounting structure of a seat belt retractor including: a locking base coupled to one side of a guide drum; a locking clutch rotatably coupled to one side surface of the locking base; and a lock arm coupled to one side surface of the locking clutch so as to rotate at a predetermined angle, and further includes a slit straightly formed at a rotation center of the lock arm; and a spring inserted into the slit to be straightly fixed to one surface of the lock arm.

In addition, the end of the spring fixed to the lock arm may form a free end which is rotated in accordance with the rotation of the lock arm.

Further, the spring may have a curved portion formed in the middle position thereof.

Furthermore, the spring may be formed in a stair shape composed of a plurality of stages.

In addition, the spring may be a leaf spring.

Further, the spring may be a torsion spring.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described with reference to the accompanying drawings.

First Exemplary Embodiment

Figure 1:
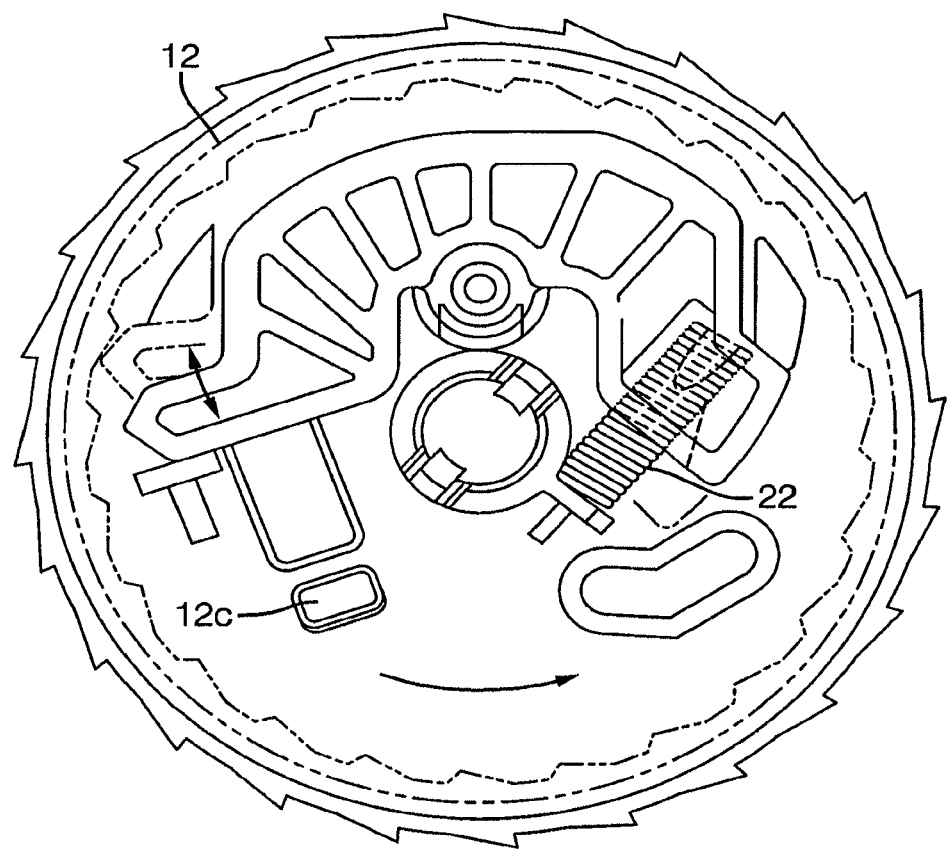
FIG. 1 is a side view of a conventional seat belt retractor.
Figure 2:
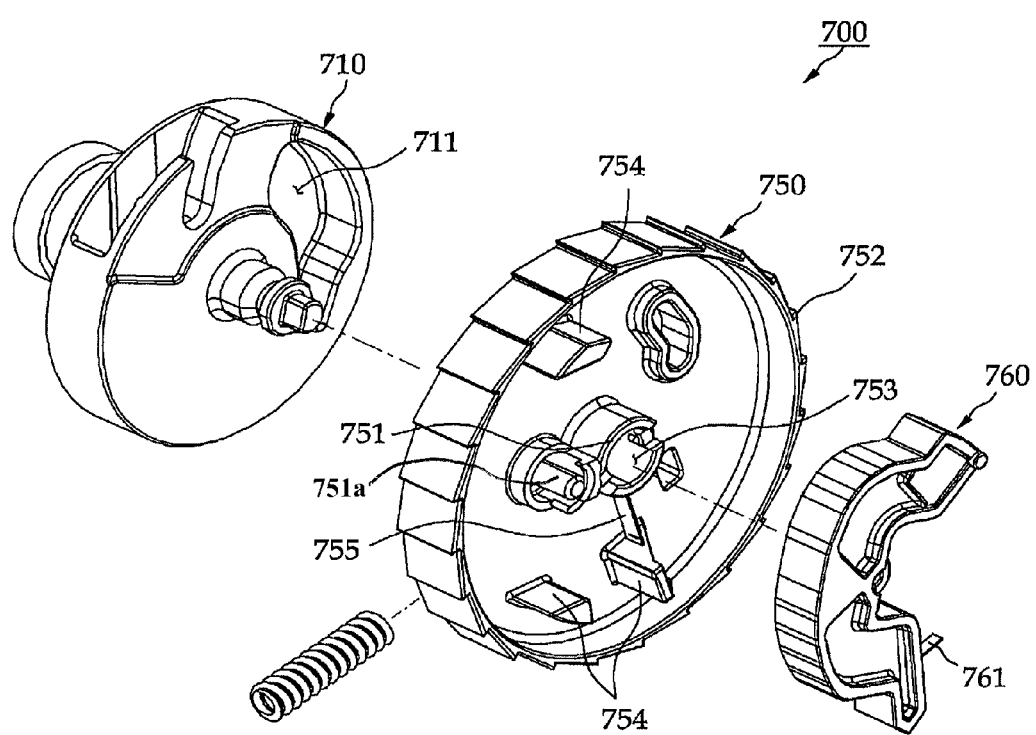
FIG. 2 is an exploded perspective view of a locking member mounting structure of a seat belt retractor according to a first embodiment of the present invention.
Figure 3:
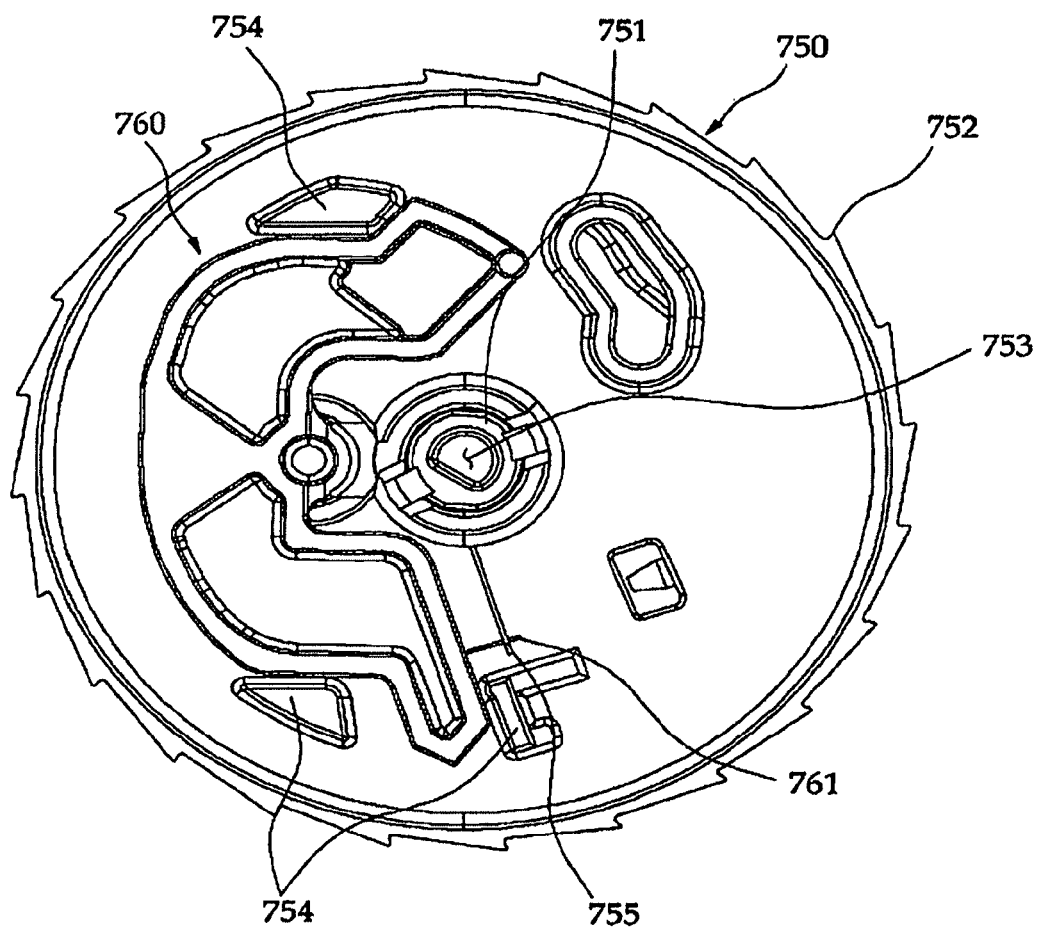
FIG. 3 is a side view of the locking member mounting structure of the seat belt retractor according to the first embodiment.

FIG. 2 is an exploded perspective view of a locking member mounting structure of a seat belt retractor according to a first exemplary embodiment of the present invention, and FIG. 3 is a side view of the locking member mounting structure of the seat belt retractor according to the first exemplary embodiment of the present invention.

As shown in FIGS. 2 and 3, the locking member mounting structure includes a leaf spring 755 fixed to a boss 751 of a locking clutch 750 and a fixing piece 761 which is formed to be projected from a lock arm 760 so as to be fixed to the leaf spring 755.

In the present invention, a locking member 700 is installed in the seat belt retractor. When webbing is unfastened or rewound, the locking member 700 serves to smoothly rotate the webbing. Further, when the webbing is rapidly unfastened, the locking member 70 serves to restrict the webbing such that the webbing is not unfastened.

The locking member 700 includes a locking base 710 fixed to one end of a guide drum (not shown) which is rotatably installed in a housing (not shown) forming a main body of the seat belt retractor, a locking clutch 750 which is rotatably coupled to one side surface of the locking base 710, and a lock arm 760 which is installed on a boss 751a, formed on one surface of the locking clutch 750 as to rotate at a restricted angle.

As shown in FIGS. 2 and 3, the locking clutch 750 is formed in a disc shape having a predetermined thickness. Further, the locking clutch 750 has latches 752 formed on the outer circumferential surface thereof, a through-hole 753 formed in the center thereof, and a boss 751 formed to project on one side surface thereof outside the through-hole 753. The locking base 710 is inserted into the through-hole 753.

The leaf spring 755 with a predetermined length has one end fixed to the boss 75 and the other end extending toward a stopper 754 spaced from the boss 75. The other end of the leaf spring 755 is fixed to a fixing piece 761 of the lock arm 760. The stopper 754 which restricts the rotation of the lock arm 760 is formed in a predetermined position on the side surface of the locking clutch 750 where the boss 751 projects.

Further, the locking clutch 750 has a protrusion piece (not shown) formed on the other side surface thereof, the protrusion piece being inserted into a groove 711 formed in the locking base 710.

The one end of the leaf spring 755 can be inserted and fixed to a groove or hole formed in the boss 751. Particularly, since the leaf spring 755 is wound along the outer circumferential surface of the boss 751, the one end of the leaf spring 755 can be fixed to the groove or hole formed in the boss 751.

In addition, the fixing piece 761 projecting toward the leaf spring 755 is fixed to a predetermined position of the lock arm 760, that is, on the surface of the lock arm 760 coming in contact with the leaf spring 755. The fixing piece 761 has a penetrated hole or groove to which the leaf spring 755 is fixed.

In the locking member mounting structure of seat belt retractor constructed in such a manner, the locking base 710 is inserted and fixed to one side surface of the guide drum, and the locking clutch 750 is coupled to the one side surface of the locking base 710 so as to rotate at a predetermined angle.

Further, the lock arm 760 is coupled to one side surface of the locking clutch 750 so as to rotate at a predetermined angle, and a mechanism cover (not shown) is fixed to the outside of the locking clutch 750.

The one end of the leaf spring 755 coupled to the locking clutch 750 is inserted and fixed to a groove or hole formed in the boss 751, and the other end thereof is inserted and fixed to a groove or hole formed in the fixing piece 761.

Accordingly, in a state where a passenger pulls or extracts webbing, the webbing is rewound. Since the fastening or rewinding of the webbing is a basic operation of the seat belt retractor, the descriptions thereof will be brief.

That is, when a passenger pulls the webbing with a proper force so as to wear the webbing, the guide drum is rotated so that the webbing is unfastened. When the pulled webbing is released, the webbing is rewound by the restoring force of a spring built in a spring case (not shown) coupled to the seat belt retractor.

As such, if the guide drum is rapidly rotated when the webbing is unfastened, the seat belt retractor restricts the webbing from being unfastened.

When the webbing is unfastened as described above, the locking base 710 and the locking clutch 750 are rotated with the guide drum of the seat belt retractor. Further, the lock arm 760 installed in the locking clutch 750 is rotated in the restricted range.

In other words, when the passenger pulls the webbing at a normal speed, not rapidly, such that the webbing is unfastened, the locking base 710, the locking clutch 750, and the lock arm 760, which serve as the locking member 700, are rotated with the guide drum.

When the locking member 700 is rotated, and if the pulling speed of the webbing increases, a rotational inertia force (centrifugal force) is generated in the locking member 700. Then, the lock arm 760 installed in the locking clutch 750 is rotated by the rotational inertia force.

The lock arm 760 rotated in such a manner is locked to a latch of the mechanism cover, thereby preventing the webbing from being unfastened.

Meanwhile, if the pulling speed of the webbing is increased when the locking member 700 is rotated, a rotational inertia force is generated. Then, a pawl (not shown) coupled to the locking base 710 is separately driven by the rotational inertia force.

The magnitudes of the rotational inertia forces generated in the lock arm 760 and the pawl of the locking base 710 differ depending on the pulling speed of the webbing and the rotational force. Therefore, the lock arm 760 and the pawl are separately driven depending on the magnitudes of the rotational inertia forces, thereby preventing the webbing from being unfastened.

Second Exemplary Embodiment

Figure 4:
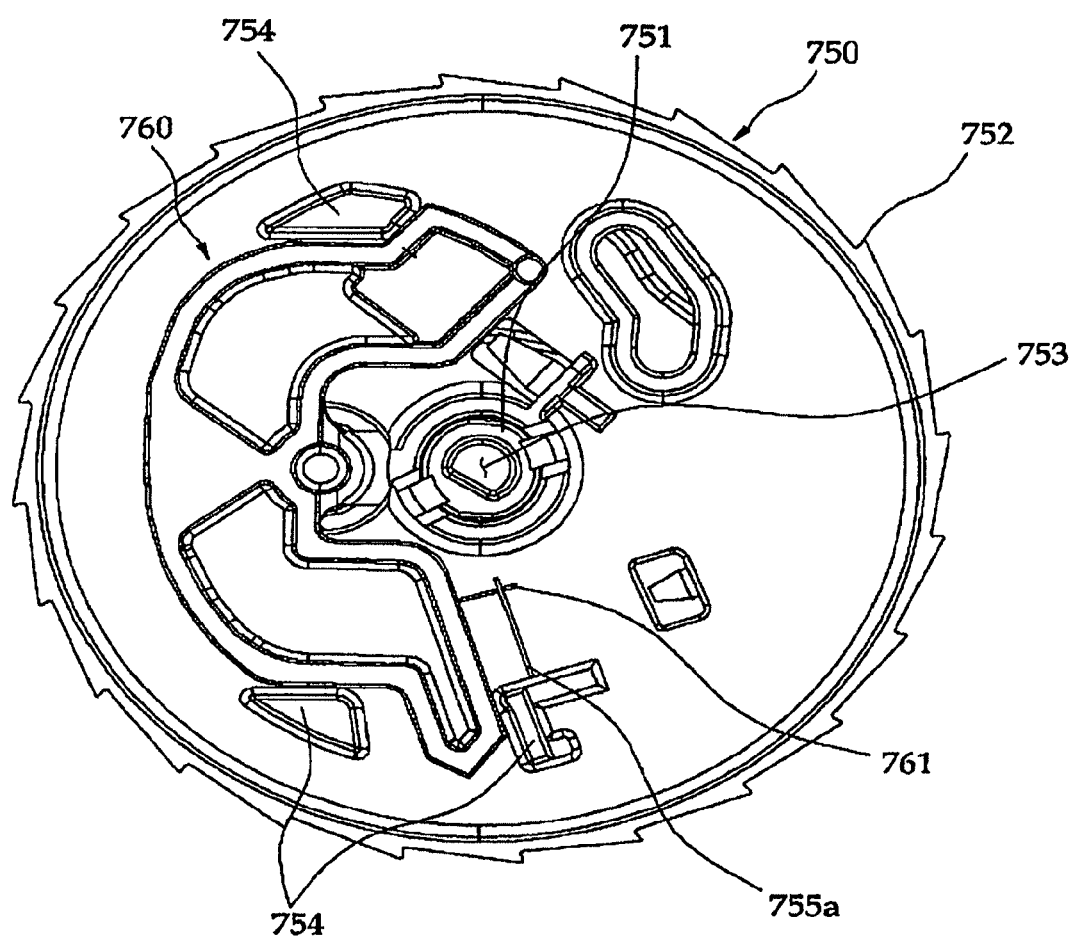
FIG. 4 is a side view of a locking member mounting structure of a seat belt retractor according to a second exemplary embodiment of the present invention.

FIG. 4 is a side view of a locking member mounting structure of a seat belt retractor according to a second exemplary embodiment of the present invention.

In the second exemplary embodiment, like reference numerals refer to like components of the first exemplary embodiment, and thus duplicate descriptions thereof will be omitted.

Different from the first exemplary embodiment, one end of a leaf spring 755*a* is fixed to the stopper 754 adjacent to the boss 751. That is, while one end of the leaf spring 755 is fixed to the boss 751 in the first exemplary embodiment, one end of the leaf spring 755*a* is fixed to the stopper 754, and the other end thereof is fixed to the fixing piece 761 of the lock arm 760 in the second exemplary embodiment.

In the second exemplary embodiment, only the shape of the leaf spring 755*a* differs from that of the first exemplary embodiment. The locking clutch 750 and the lock arm 760 are operated in the same manner as the first exemplary embodiment, and thus the descriptions thereof will be omitted.

Third Exemplary Embodiment

A third exemplary embodiment of the present invention will now be described with reference to FIG. 5. The same reference numerals designate the same components as the first embodiment and description thereof will not be repeated.

Figure 5:
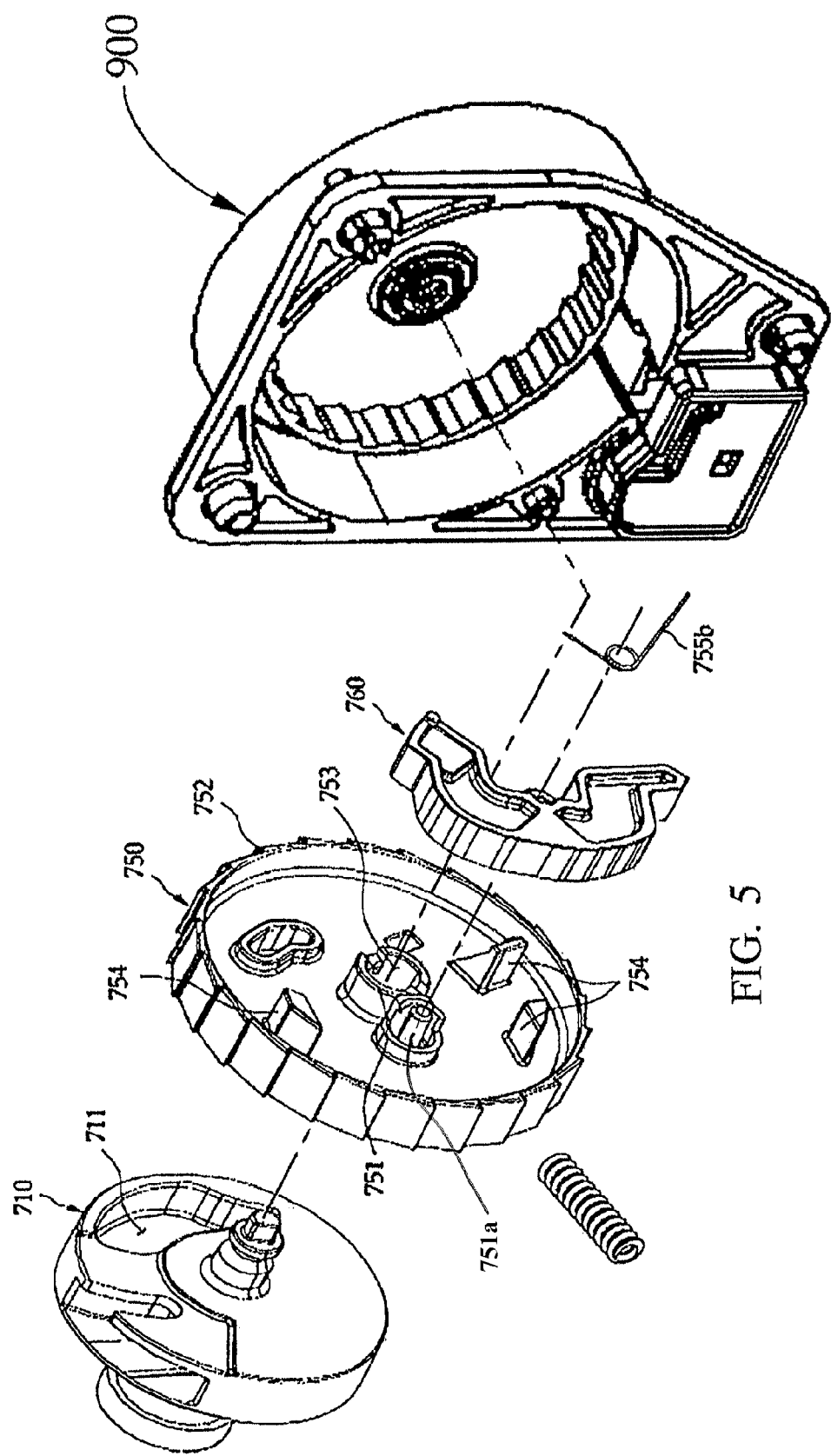
FIG. 5 is an exploded perspective view of a leaf spring according to a third exemplary embodiment of the present invention.

As shown in FIG. 5, a torsion spring 755*b* of the present invention has one end coming in contact with one side of the lock arm 760, which is mounted to a boss 751*a* formed on the locking clutch 750. The torsion spring 755*b* extends in the rotation center direction of the lock arm 760 such that the middle portion of the torsion spring 755*b* is wound in a circular or circular-arc shape winding the rotation center axis of the lock arm 760. The other end of the torsion spring 755*b* is fixed to one side of the stopper 754.

That is, the torsion spring 755*b* extends to both sides with a symmetric angle from the rotation center of the lock arm 760. The one end of the torsion spring 755*b* comes in contact with the lock arm 760, and the other end thereof is fixed to the stopper 754.

The one end of the torsion spring 755*b* fixed in such a manner serves as a free end such that the lock arm 760 can be rotated in the restricted angle range by a rotational inertia force, and the other end of the torsion spring 755*b* serves as a fixed end which is fixed to the stopper 754 so as not to move.

In the torsion spring 755*b* constructed in such a manner, the one end thereof freely moves using its elastic force in accordance with the rotation of the lock arm 760, and the other end thereof is fixed to the stopper 765 so as not to move. Therefore, the lock arm 760 is driven by the rotational inertia force, thereby preventing the webbing from being rapidly unfastened.

The lock arm 760 is operated in the same manner as the first or second exemplary embodiment, and thus the specific descriptions thereof will be omitted.

Fourth Exemplary Embodiment

A fourth exemplary embodiment of the present invention will now be described with reference to FIG. 6, and the same reference numerals designate the same components as the above embodiments and description thereof will not be repeated.

Figure 6A:
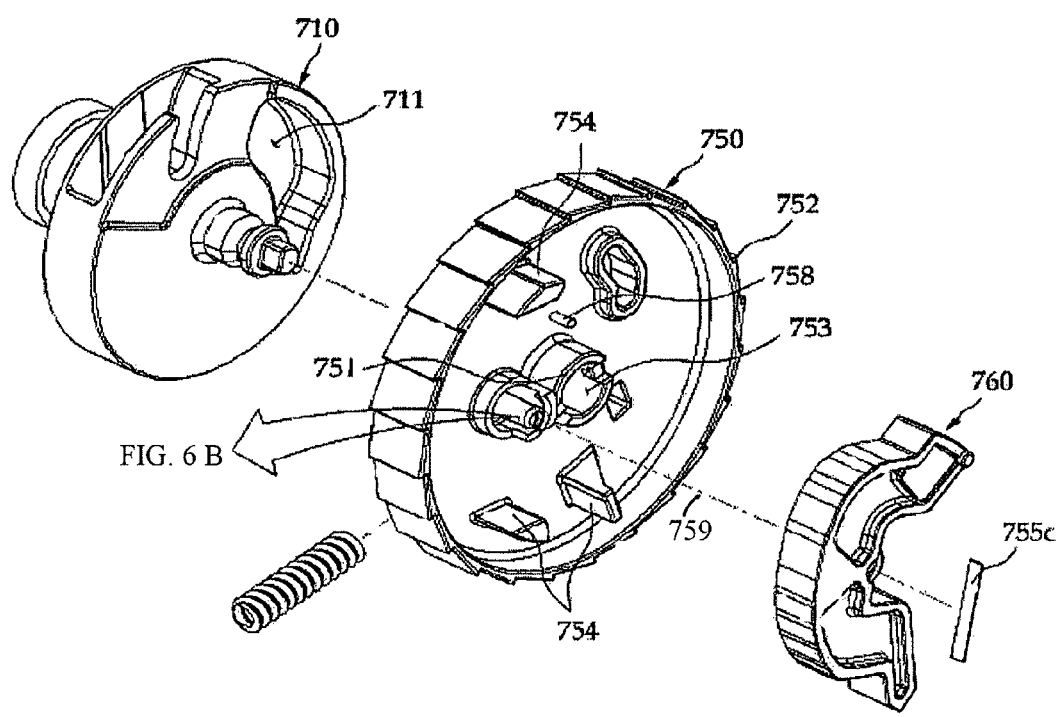
FIG. 6A is an exploded perspective view of a leaf spring according to a fourth exemplary embodiment of the present invention.
Figure 6B:
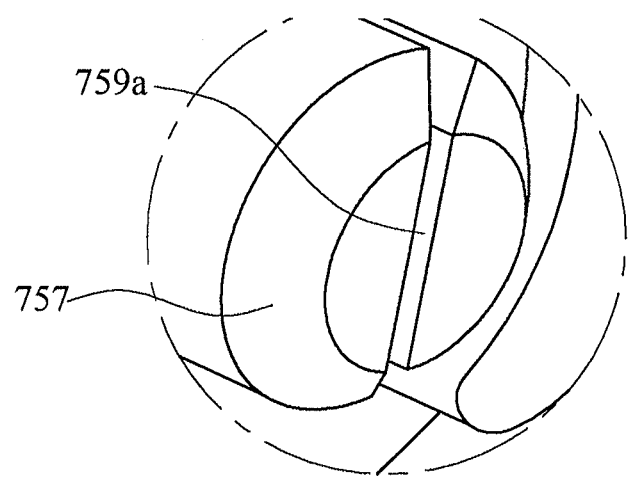
FIG. 6B is an enlarged portion of FIG. 6A.

As shown in FIG. 6, a leaf spring 755*c* of the fourth exemplary embodiment is formed in a straight line. One end of the leaf spring 755*c* is fixed to the lock arm 760, and the other end thereof passes through a slit 759*a* formed in the boss 757 defining the rotation center axis 759 of the lock arm 760 so as to be fixed to one side of a fixing protrusion 758 protruding from the locking clutch 750.

That is, the one end of the leaf spring 755*c* is fixed to the lock arm 760, and the other end of the leaf spring 755*c* passes through a slit 759*a*, aligned with the rotation center axis 759 of the lock arm 760, so as to be fixed to one side of the fixing protrusion 758 protruding from the locking clutch 750.

In the leaf spring 755*c* according to the fourth exemplary embodiment of the present invention, the one end thereof freely moves using its elastic force in accordance with the rotation of the lock arm 760, and the other end thereof is fixed to the fixing protrusion 758. Therefore, the lock arm 760 is driven by a rotational inertia force, thereby preventing the webbing from being rapidly unfastened.

Fifth Exemplary Embodiment

Figure 7:
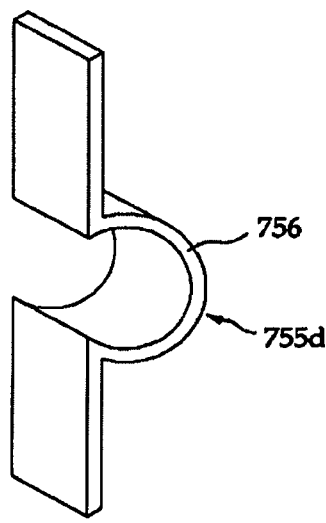
FIG. 7 is a perspective view of a leaf spring according to a fifth exemplary embodiment of the present invention.

FIG. 7 is a perspective view of a leaf spring according to a fifth exemplary embodiment of the present invention.

In the fifth embodiment, the leaf spring 755*d* has a curved portion 756 formed in the middle position thereof the curved portion 756 being formed in a circular arc.

Each of the leaf springs 755, 755*a*, 755*b*, and 755*c* of the above-described exemplary embodiments may have a curved portion in the middle position thereof the curved portion being formed in a circular arc. For example, the leaf spring 755*b* of the third exemplary embodiment may have a curved portion 756 in the middle position between the rotation center axis of the lock arm 760 and the leading end of the leaf spring 755*b*, in addition to the circular arc winding the rotation center axis of the lock arm 760.

Such a curved portion 756 increases the elasticity of the leaf spring 755, 755*a*, 755*b*, or 755*c*. Further, although the leaf spring 755, 755*a*, 755*b*, or 755*c* is used for a long period, deformation of the leaf spring 755, 755*a*, 755*b*, or 755*c* is prevented, and elasticity is maintained.

In the fifth exemplary embodiment, the locking clutch 750 and the lock arm 760 are operated in the same manner as the above-described exemplary embodiments, and thus descriptions thereof will be omitted.

Sixth Exemplary Embodiment

Figure 8:
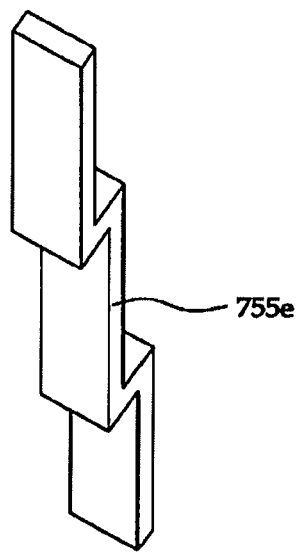
FIG. 8 is a perspective view of a leaf spring according to a sixth exemplary embodiment of the present invention.

FIG. 8 is a perspective view of a leaf spring according to a sixth exemplary embodiment of the present invention.

The leaf spring 755*e* of the sixth exemplary embodiment is formed in a stair shape composed of a plurality of stages. In the sixth exemplary embodiment, the locking clutch 750 and the lock arm 760 are operated in the same manner as the above-described exemplary embodiments, and thus descriptions thereof will be omitted.

According to the present invention, the spring which returns the lock arm installed in the locking clutch is simply assembled, which mean that assembly time of the spring is reduced to thereby increase productivity. Further, since the spring has a curved portion or is formed in a stair shape, the elasticity of the spring is maintained, and the deformation of the spring is prevented.

Further, the spring of the present invention is formed in various shapes. Therefore, although the shapes of the locking clutch and the lock arm are changed, the leaf spring can be applied thereto.

While this invention has been described with reference to exemplary embodiments thereof, it will be clear to those of ordinary skill in the art to which the present invention pertains that various modifications may be made to the described embodiments without departing from the spirit and scope of the present invention as defined in the appended claims and their equivalents.

What is claimed is:

1. A locking member mounting structure coupled to one side of a guide drum of a seat belt retractor, the locking member mounting structure comprising:

a locking base; a locking clutch rotatably coupled to one side surface of the locking base; a lock arm coupled to one side surface of the locking clutch so as to rotate at a predetermined angle; a boss formed on the locking clutch and defining a rotational center of the lock arm; a plurality of stoppers formed on the locking clutch and limiting rotation of the lock arm by interfering engagement with an end of the lock arm so as to define the predetermined angle of the lock arm; a second boss extending from a center of the locking clutch; a mechanism cover having protrusions configured to interact with an end of the lock arm; and a spring for recovering the lock arm, the spring having a first end portion in fixed engagement with one of the plurality of stoppers of the locking clutch and a second end portion freely engaged with the locking arm and having a middle portion between the first portion and the second portion, the middle portion having a circular shape and the circular shape extending around an outer circumference of the boss defining the rotational center of the lock arm, the first end portion being fixedly coupled to the one of the plurality of stoppers that blocks counterclockwise rotation of the lock arm by direct engagement with the end of the lock arm that interacts with the protrusion of the mechanism cover, and wherein the second portion of the spring is engaged with the lock arm so as to rotate in accordance with rotation of the lock arm.

2. The locking member mounting structure according to claim 1 wherein the spring is a torsion spring.

* * * * *